(12) United States Patent
Cue et al.

(10) Patent No.: US 11,507,613 B2
(45) Date of Patent: Nov. 22, 2022

(54) METHOD AND SYSTEM FOR SHARING PLAYLISTS

(71) Applicant: Apple Inc., Cupertino, CA (US)

(72) Inventors: Eddy Cue, Mountain View, CA (US); Robert Kondrk, Mountain View, CA (US); Patrice Gautier, San Francisco, CA (US); Jeffrey L. Robbin, Los Altos, CA (US); David Heller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1044 days.

(21) Appl. No.: 15/658,353

(22) Filed: Jul. 24, 2017

(65) Prior Publication Data

US 2018/0052854 A1 Feb. 22, 2018

Related U.S. Application Data

(63) Continuation of application No. 10/833,879, filed on Apr. 27, 2004, now Pat. No. 9,715,500.

(51) Int. Cl.
| | |
|---|---|
| *G06F 16/438* | (2019.01) |
| *G06Q 10/10* | (2012.01) |
| *G06Q 30/02* | (2012.01) |
| *G06Q 30/06* | (2012.01) |
| *H04L 67/01* | (2022.01) |

(Continued)

(52) U.S. Cl.
CPC ........ *G06F 16/4387* (2019.01); *G06F 3/0482* (2013.01); *G06F 3/0484* (2013.01); *G06Q 10/107* (2013.01); *G06Q 30/02* (2013.01); *G06Q 30/0203* (2013.01); *G06Q 30/0245* (2013.01); *G06Q 30/06* (2013.01); *G06Q 30/0601* (2013.01); *G06Q 30/0603* (2013.01);
(Continued)

(58) Field of Classification Search
CPC .... H04H 60/02; G11B 27/105; G10H 1/0008; G10H 1/0058; H04L 29/12122; G06F 17/2241; G06F 16/4387
See application file for complete search history.

(56) References Cited

U.S. PATENT DOCUMENTS

| | | |
|---|---|---|
| 3,990,710 A | 11/1976 | Hughes |
| 4,528,643 A | 7/1985 | Freeny, Jr. |

(Continued)

FOREIGN PATENT DOCUMENTS

| | | |
|---|---|---|
| EP | 0917077 A2 | 5/1999 |
| EP | 0982732 A1 | 3/2000 |

(Continued)

OTHER PUBLICATIONS

"About MusicMatch Jukebox," MusicMatch Jukebox v4 Help, pp. 1-4 (1999).

(Continued)

*Primary Examiner* — Etienne P Leroux
(74) *Attorney, Agent, or Firm* — Blank Rome LLP

(57) ABSTRACT

Methods and systems for publishing a playlist are disclosed. A user generates or selects a playlist, which is then provided (e.g., uploaded) for publishing. A playlist identifying at least one of one or more tracks and one or more albums is received. The playlist may then be published such that the playlist is viewable by one or more individuals. A user may then purchase one or more tracks/albums identified in the playlist via an online store.

15 Claims, 7 Drawing Sheets

(51) Int. Cl.
*G06F 3/0482* (2013.01)
*G06F 3/0484* (2022.01)

(52) U.S. Cl.
CPC ..... *G06Q 30/0625* (2013.01); *G06Q 30/0643* (2013.01); *H04L 67/01* (2022.05)

(56) References Cited

U.S. PATENT DOCUMENTS

| | | |
|---|---|---|
| 4,851,931 A | 7/1989 | Parker |
| 5,168,481 A | 12/1992 | Culbertson |
| 5,181,107 A | 1/1993 | Rhoades |
| 5,191,573 A | 3/1993 | Hair |
| 5,341,350 A | 8/1994 | Frank |
| 5,355,302 A | 10/1994 | Martin |
| 5,418,713 A | 5/1995 | Allen |
| 5,428,735 A | 6/1995 | Kahl |
| 5,459,824 A | 10/1995 | Kashiwazaki |
| 5,481,509 A | 1/1996 | Knowles |
| 5,504,852 A | 4/1996 | Thompson-Rohrlich |
| 5,559,945 A | 9/1996 | Beaudet |
| 5,561,604 A | 10/1996 | Buckley |
| 5,566,353 A | 10/1996 | Cho |
| 5,583,993 A | 12/1996 | Foster |
| 5,587,404 A | 12/1996 | Hubertus |
| 5,616,876 A | 4/1997 | Cluts |
| 5,633,839 A | 5/1997 | Alexander |
| 5,640,566 A | 6/1997 | Victor |
| 5,666,530 A | 9/1997 | Clark |
| 5,710,922 A | 1/1998 | Alley |
| 5,714,971 A | 2/1998 | Shalit |
| 5,721,949 A | 2/1998 | Smith |
| 5,726,909 A | 3/1998 | Krikorian |
| 5,727,202 A | 3/1998 | Kucala |
| 5,734,823 A | 3/1998 | Saigh |
| 5,739,451 A | 4/1998 | Winksy |
| 5,740,134 A | 4/1998 | Peterson |
| 5,819,160 A | 10/1998 | Foladare |
| 5,835,721 A | 11/1998 | Donahue |
| 5,835,732 A | 11/1998 | Kikinis |
| 5,845,282 A | 12/1998 | Alley |
| 5,864,868 A | 1/1999 | Contois |
| 5,875,110 A | 2/1999 | Jacobs |
| 5,897,642 A | 4/1999 | Capossela |
| 5,903,892 A | 5/1999 | Hoffert |
| 5,918,213 A | 6/1999 | Bernard |
| 5,918,303 A | 6/1999 | Yamaura |
| 5,923,757 A | 7/1999 | Hocker et al. |
| 5,925,843 A | 7/1999 | Miller et al. |
| 5,926,819 A | 7/1999 | Doo |
| 5,963,916 A | 10/1999 | Kaplan |
| 5,969,283 A | 10/1999 | Looney |
| 5,983,069 A | 11/1999 | Cho |
| 5,995,098 A | 11/1999 | Okada |
| 6,000,000 A | 12/1999 | Hawkins |
| 6,006,274 A | 12/1999 | Hawkins |
| 6,038,199 A | 3/2000 | Pawlowski |
| 6,041,023 A | 3/2000 | Lakhansingh |
| 6,052,797 A | 4/2000 | Ofek |
| 6,061,306 A | 5/2000 | Buchheim |
| 6,125,369 A | 9/2000 | Wu |
| 6,172,948 B1 | 1/2001 | Keller |
| 6,208,044 B1 | 3/2001 | Viswanadham |
| 6,216,131 B1 | 4/2001 | Liu |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1 | 6/2001 | Dwek |
| 6,255,961 B1 | 7/2001 | Van Ryzin et al. |
| 6,272,545 B1 | 8/2001 | Flanagin et al. |
| 6,283,764 B2 | 9/2001 | Kajiyama et al. |
| 6,295,541 B1 | 9/2001 | Bodnar |
| 6,332,175 B1 | 12/2001 | Birrell |
| 6,338,044 B1 | 1/2002 | Cook |
| 6,341,316 B1 | 1/2002 | Kloba |
| 6,356,971 B1 | 3/2002 | Katz |
| 6,380,947 B1 | 4/2002 | Stead |
| 6,389,467 B1 | 5/2002 | Eyal |
| 6,407,750 B1 | 6/2002 | Gioscia |
| 6,434,680 B2 | 8/2002 | Belknap et al. |
| 6,446,080 B1 | 9/2002 | Van Ryzin |
| 6,452,609 B1 | 9/2002 | Katinsky |
| 6,453,281 B1 | 9/2002 | Walters |
| 6,490,432 B1 | 12/2002 | Wegener |
| 6,493,758 B1 | 12/2002 | McLain |
| 6,523,124 B1 | 2/2003 | Lunsford |
| 6,529,804 B1 | 3/2003 | Draggon |
| 6,563,769 B1 | 5/2003 | Van Der Meulen |
| 6,587,403 B1 | 7/2003 | Keller |
| 6,587,404 B1 | 7/2003 | Keller |
| 6,621,768 B1 | 9/2003 | Keller |
| 6,636,873 B1 | 10/2003 | Carini |
| 6,664,981 B2 | 12/2003 | Ashe |
| 6,665,803 B2 | 12/2003 | Lunsford |
| 6,718,348 B1 | 4/2004 | Novak |
| 6,721,489 B1 | 4/2004 | Benyamin |
| 6,731,312 B2 | 5/2004 | Robbin |
| 6,760,721 B1 | 7/2004 | Chasen |
| 6,763,345 B1 * | 7/2004 | Hempieman ........ G10H 1/0008 |
| 6,779,019 B1 | 8/2004 | Mousseau |
| 6,785,542 B1 | 8/2004 | Blight |
| 6,794,566 B2 | 9/2004 | Pachet |
| 6,801,964 B1 | 10/2004 | Mahdavi |
| 6,868,440 B1 | 3/2005 | Gupta |
| 6,874,037 B1 | 3/2005 | Abram |
| 6,928,433 B2 | 8/2005 | Goodman |
| 6,933,433 B1 | 8/2005 | Porteus |
| 6,941,324 B2 | 9/2005 | Plastina |
| 6,976,028 B2 | 12/2005 | Fenton |
| 6,978,127 B1 | 12/2005 | Bulthuis |
| 6,987,221 B2 | 1/2006 | Platt |
| 7,003,495 B1 | 2/2006 | Burger |
| 7,043,477 B2 | 5/2006 | Mercer |
| 7,055,165 B2 | 5/2006 | Connelly |
| 7,089,198 B2 | 8/2006 | Freedenberg |
| 7,111,009 B1 | 9/2006 | Gupta |
| 7,117,516 B2 | 10/2006 | Khoo |
| 7,126,770 B1 | 10/2006 | Arai |
| 7,136,874 B2 | 11/2006 | Mercer |
| 7,171,557 B2 | 1/2007 | Kallahalla |
| 7,209,633 B1 | 4/2007 | Novak |
| 7,228,298 B1 | 6/2007 | Raines |
| 7,272,385 B2 | 9/2007 | Mirouze |
| 7,478,323 B2 | 1/2009 | Dowdy |
| 7,502,626 B1 | 3/2009 | Lemilainen |
| 7,667,124 B2 | 2/2010 | Robbin |
| 7,797,446 B2 | 9/2010 | Heller |
| 8,260,656 B1 * | 9/2012 | Harbick ................ G06Q 30/02 705/7.31 |
| 8,261,246 B1 | 9/2012 | Naroff |
| 2001/0004310 A1 | 6/2001 | Kono |
| 2001/0011308 A1 | 8/2001 | Clark |
| 2001/0018858 A1 | 9/2001 | Dwek |
| 2001/0021053 A1 | 9/2001 | Colbourne |
| 2001/0041021 A1 | 11/2001 | Boyle |
| 2001/0044835 A1 | 11/2001 | Schober |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan |
| 2002/0013784 A1 | 1/2002 | Swanson |
| 2002/0015161 A1 | 2/2002 | Haneda |
| 2002/0016968 A1 | 2/2002 | Nathan |
| 2002/0027561 A1 | 3/2002 | Wu |
| 2002/0046315 A1 | 4/2002 | Miller |
| 2002/0054079 A1 | 5/2002 | Russel |
| 2002/0055934 A1 | 5/2002 | Lipscomb |
| 2002/0073167 A1 | 6/2002 | Powell |
| 2002/0080180 A1 | 6/2002 | Mander |
| 2002/0104084 A1 * | 8/2002 | Ching .................... H04N 7/165 725/36 |
| 2002/0116082 A1 | 8/2002 | Gudorf |
| 2002/0118300 A1 | 8/2002 | Middleton |
| 2002/0133515 A1 | 9/2002 | Kagle |
| 2002/0138606 A1 | 9/2002 | Robison |

(56) References Cited

U.S. PATENT DOCUMENTS

| | | |
|---|---|---|
| 2002/0152278 A1 | 10/2002 | Pontenzone |
| 2002/0161865 A1 | 10/2002 | Nguyen |
| 2002/0174021 A1 | 11/2002 | Chu |
| 2002/0174201 A1* | 11/2002 | Ramer ............... G06F 17/2241 709/220 |
| 2002/0174269 A1 | 11/2002 | Spurgat |
| 2002/0193895 A1 | 12/2002 | Qian |
| 2002/0194195 A1 | 12/2002 | Fenton |
| 2002/0194309 A1 | 12/2002 | Carter |
| 2003/0013493 A1 | 1/2003 | Irimajiri |
| 2003/0014767 A1 | 1/2003 | Stumphauzer |
| 2003/0025834 A1 | 2/2003 | Atkin |
| 2003/0028539 A1 | 2/2003 | Nunome |
| 2003/0029914 A1 | 2/2003 | Hortman |
| 2003/0030733 A1 | 2/2003 | Seaman |
| 2003/0037254 A1 | 2/2003 | Fischer |
| 2003/0046434 A1 | 3/2003 | Flanagin |
| 2003/0050058 A1 | 3/2003 | Walsh |
| 2003/0055723 A1 | 3/2003 | English |
| 2003/0074457 A1 | 4/2003 | Kluth |
| 2003/0079038 A1 | 4/2003 | Robbin |
| 2003/0081784 A1 | 5/2003 | Kallahalla |
| 2003/0093340 A1 | 5/2003 | Krystek |
| 2003/0098893 A1 | 5/2003 | Makinen |
| 2003/0107585 A1 | 6/2003 | Samuelson |
| 2003/0112279 A1 | 6/2003 | Irimajiri |
| 2003/0149628 A1 | 8/2003 | Abbosh |
| 2003/0163399 A1 | 8/2003 | Harper |
| 2003/0167318 A1 | 9/2003 | Robbin |
| 2003/0174882 A1 | 9/2003 | Turpin |
| 2003/0182315 A1 | 9/2003 | Plastina |
| 2003/0191756 A1 | 10/2003 | Oh |
| 2003/0206203 A1 | 11/2003 | Ly |
| 2003/0210821 A1 | 11/2003 | Yogeshwar |
| 2003/0221541 A1* | 12/2003 | Platt ............... G10H 1/0058 84/609 |
| 2003/0225834 A1 | 12/2003 | Lee |
| 2004/0001395 A1 | 1/2004 | Keller |
| 2004/0001396 A1 | 1/2004 | Keller |
| 2004/0017997 A1 | 1/2004 | Cowgill |
| 2004/0019497 A1 | 1/2004 | Volk |
| 2004/0027930 A1 | 2/2004 | Kudo |
| 2004/0054542 A1 | 3/2004 | Foote |
| 2004/0055446 A1 | 3/2004 | Robbin |
| 2004/0071922 A1 | 4/2004 | McCarthy |
| 2004/0076086 A1 | 4/2004 | Keller |
| 2004/0078383 A1 | 4/2004 | Mercer |
| 2004/0083480 A1 | 4/2004 | Dodge |
| 2004/0093274 A1 | 5/2004 | Vanska |
| 2004/0101287 A1 | 5/2004 | Seo |
| 2004/0103102 A1 | 5/2004 | Nelson |
| 2004/0113915 A1 | 6/2004 | Ohtsuki |
| 2004/0123242 A1 | 6/2004 | McKibben |
| 2004/0123725 A1 | 7/2004 | Kim |
| 2004/0128277 A1 | 7/2004 | Mander |
| 2004/0139180 A1 | 7/2004 | White |
| 2004/0148358 A1 | 7/2004 | Singh |
| 2004/0162765 A1 | 8/2004 | Reber |
| 2004/0164991 A1 | 8/2004 | Rose |
| 2004/0205005 A1 | 10/2004 | Matsunaga |
| 2004/0205028 A1 | 10/2004 | Verosub |
| 2004/0223245 A1 | 11/2004 | Morohashi |
| 2004/0225762 A1 | 11/2004 | Poo |
| 2004/0261064 A1 | 12/2004 | Goldstein |
| 2005/0015807 A1 | 1/2005 | Young |
| 2005/0031197 A1 | 2/2005 | Knopp |
| 2005/0055718 A1 | 3/2005 | Stone |
| 2005/0060264 A1* | 3/2005 | Schrock ............... G11B 27/105 705/51 |
| 2005/0071780 A1 | 3/2005 | Muller |
| 2005/0080915 A1 | 4/2005 | Shoemaker |
| 2005/0091402 A1* | 4/2005 | Satagopan ........ H04L 29/12122 709/245 |
| 2005/0141771 A1 | 6/2005 | Yamakado |
| 2005/0149392 A1 | 7/2005 | Gold |
| 2005/0235015 A1 | 10/2005 | Abanami |
| 2005/0240494 A1 | 10/2005 | Cue |
| 2005/0240661 A1 | 10/2005 | Heller |
| 2005/0249080 A1 | 11/2005 | Foote |
| 2005/0262528 A1 | 11/2005 | Herley |
| 2005/0267803 A1 | 12/2005 | Patel |
| 2005/0278377 A1 | 12/2005 | Mirrashidi |
| 2006/0015378 A1 | 1/2006 | Mirrashidi |
| 2006/0036567 A1 | 2/2006 | Tan |
| 2006/0066627 A1 | 3/2006 | Gerhard |
| 2006/0089949 A1 | 4/2006 | Robbin |
| 2006/0100978 A1 | 5/2006 | Heller |
| 2006/0156236 A1 | 7/2006 | Heller |
| 2006/0156239 A1 | 7/2006 | Jobs |
| 2006/0163358 A1 | 7/2006 | Biderman |
| 2006/0168340 A1 | 7/2006 | Heller |
| 2006/0247980 A1 | 11/2006 | Mirrashidi |
| 2008/0256378 A1 | 10/2008 | Guillorit |
| 2009/0063496 A1 | 3/2009 | Cunningham |
| 2009/0063543 A1 | 3/2009 | Martin |
| 2010/0042654 A1 | 2/2010 | Heller |

FOREIGN PATENT DOCUMENTS

| | | |
|---|---|---|
| EP | 1028425 A2 | 8/2000 |
| EP | 1056093 A1 | 11/2000 |
| EP | 1548740 A2 | 6/2005 |
| JP | 2000285656 A | 10/2000 |
| JP | 2000339917 A | 12/2000 |
| JP | 2001076465 A | 3/2001 |
| JP | 2001093226 A | 4/2001 |
| JP | 2001117800 A | 4/2001 |
| JP | 2001291365 A | 10/2001 |
| JP | 2002074909 A | 3/2002 |
| JP | 2003050588 A | 2/2003 |
| JP | 2003051179 A | 2/2003 |
| WO | 9516950 A1 | 6/1995 |
| WO | 0133569 A1 | 5/2001 |
| WO | 0167753 A1 | 9/2001 |
| WO | 0225610 A1 | 3/2002 |
| WO | 0225935 A2 | 3/2002 |
| WO | 0323786 A2 | 1/2003 |
| WO | 03025933 A1 | 3/2003 |
| WO | 03038700 A1 | 5/2003 |
| WO | 2004004338 A1 | 1/2004 |
| WO | 2004084413 A2 | 1/2004 |
| WO | 2005014262 A1 | 2/2005 |
| WO | 2005073856 A2 | 8/2005 |
| WO | 2005106752 A2 | 11/2005 |

OTHER PUBLICATIONS

"Apple Announces iTunes 2," Press Release, Apple Computer, Inc., Oct. 23, 2001.

"Apple Introduces iTunes—World's Best and Easiest to Use Jukebox Software," Macworld Expo, San Francisco, Jan. 9, 2001.

"Broadcast Tools: SpotBase, Playlist & TapeBase," ASC Audio Video Corporation, pp. 1-2, Mar. 1998.

"CartWorks File Utilities User's Manual," dbm Systems, Inc., pp. 1-8, Jul. 1998.

"CartWorks MHD Music-on-Hard-Drive QuickSchedule User's Manual," dbm Systems, Inc., pp. 1-8, Feb. 8, 1998.

"CartWorks MHD Music-on-Hard-Drive User's Manual v6.8," dbm Systems, Inc., pp. 1-11.

"CartWorks On-Demand Editor User's Manual," dbm Systems, Inc., pp. 1-7, Feb. 1998.

"CartWorks Script Editor User's Manual v3.12," dbm Systems, Inc., pp. 1-26, Feb. 1998.

"CartWorks Spot Set Editor User's Manual," dbm Systems, Inc., pp. 1-11, Feb. 1998.

"Color and Vision Questions and Answers," Color Vision FAQ, downloaded from www.cis.rit.edu/mcsl/faq/faq1.shtml on Nov. 22, 2004.

"Color Terminology," Carnright Design, 2004, downloaded from www.carnrightdesign.com/color4business/speaking_color.htm on Jan. 13, 2005.

(56) References Cited

OTHER PUBLICATIONS

"Color Wheel," downloaded from http://hort.ifas.ufl.edu/TEACH/floral/color.htm on Jan. 13, 2005.
"Complimentary Chromatic Colors," downloaded from www.smartpixel.net/chromoweb/uks/indexgb.html on Nov. 22, 2004.
"Digital Audio Just Got Easier!," CartWorks Digital Audio Systems, dbm Systems, Inc., Jun. 26, 1996.
"Gravis WinDecks Version 1.12," screen shots, Gravis Computer Technology Ltd., pp. 1-10, Jan. 1990.
"Hewlett Packard Jornada 525 Color Pocket PC," downloaded Jan. 25, 2002, http://www.pc4d.com/electronics/products/56/jornada_525_color_pocket_pc.shtml.
"iTunes Celebrates Its First Anniversary; Over 70 Million Songs Purchase," Apr. 28, 2004, http://www.apple.com/pr/library/2004/apr/28itunes.html.
"Nomad Jukebox," User Guide, Creative Technology Ltd., Version 1, Aug. 2000.
"Rio Portable Music Player," Web Review, downloaded Jan. 25, 2002, http://www.webreviews.com/9901/rio.html.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"The DADpro Digital Audio Delivery System Operation Manual Version 1.0," IBM Corp., pp. 1-424, Aug. 30, 1996.
"Virtual Recorder—Basic Operations," ASC Audio Video Corporation, pp. 1-94, Sep. 9, 1996.
"VR300 Advanced Broadcast Video Server," ASC Audio Video Corporation, pp. 1-9, Mar. 1998.
"VR300 Video Server User Manual, Version 1.0," ASC Audio Video Corporation, pp. 1-40, Mar. 20, 1998.
"WinDecks, User Instructions," Gravis Computer Technology Ltd., pp. 1-14, Jan. 1990.
Adam C. Engst, "SoundJam Keeps on Jammin", Jun. 19, 2000, http://db.tidbits.com/getbits.acgi?tbart-05988.
Alicia Awbrey, press release entitled "Apple's iPod Available in Stores Tomorrow," Nov. 9, 2001.
Andrew Birrell, 'Personal Jukebox (PJB),' Oct. 13, 2000, http://birrell.org/andrew/talks/pjb-overview.ppt.
Andy Lindauer, "What's in your Pocket?," Edgereview, downloaded Jan. 25, 2002, http://www.edgreview.com/print.cfm?Type=aag&ID=286.
Anonymous, "KAZAA—products," Internet Citation, Aug. 10, 2003 (Aug. 10, 2003), XP002307365, Retrieved from the Internet: URL: http://www.kazaa.com/us/products/index.htm [retrieved on Nov. 22, 2004].
Birrell, et al., "Can You Carry Your CD Collection In Your Pocket?," Personal Jukebox, Compaq Computer Corp., downloaded Oct. 13, 2000, http://research.compaq.com/SRC/pjb.
Breen, Christopher, "iMixing it Up: Sharing Your Sounds," Sep. 17, 2004, http://playlistmag.com/help/2004/09/imixhowto/index.php.
Bridgman, "Windows XP Expert Zone Community Columnist," Using Windows Mobile-based Portable Media Centers and Windows Media Player 10, Aug. 25, 2004, 1-11.
Chopde, Avinash, DC/DVD Inserts and Envelopes, Nov. 2003, cdlablegens, version 3.0.0, pp. 1-5.
Communication pursuant to Article 94 (3) EPC for European Patent Application No. 05739940.4, dated Jul. 17, 2009.
Compaq Computer Corp., copyright 1991, Personal Jukebox User Manual, pp. 1-29.
De Herrera, Chris, "Microsoft ActiveSync 3.1," Version 1.02, Oct. 13, 2000.
Etchison, "Accelerated Discrete Adjustment of the Parameters of a Process," IBM Technical Disclosure Bulletin, vol. 15, No. 5, Oct. 1, 1972, 2 pgs.
Examiner's First Report for Australian Application No. 2005239426 dated Nov. 2, 2009.
Firewire, IEEE 1394 (also known as Sony's iLink), http://www.wikipedia.org/wiki/Firewire (1995).
Glenn Fleishman, "Handheld iPod joins MP3 band a bit late, but is standout player," Nov. 6, 2001, http://seattletimes.nwsource.com/html/businesstechnology/134361811_ptmacc040.html.
Half-life—Wikipedia, the free encyclopedia, http://enwikipedia.org/wiki/Half-life.
Handbook for Palm m500 Series Handhelds, User Manual.
International Search Report dated Jul. 9, 2003, from International Application No. PCT/US2003/021534.
IPod & iTunes 4, Mac People, Japan, ASCII Corporation, published Jun. 15, 2003, vol. 9, No. 12, p. 54.
Iriver, "PMP140/120," Sep. 13, 2004, pp. 1-2.
ITunes 2, Playlist Related Help Screens, iTunes v2.0, Apple Computer, Inc., Oct. 23, 2001.
ITunes, Digital Music for your Mac, Apple Computer, Inc., downloaded Oct. 22, 2001, http://www.apple.com/itunes.
ITunes, Playlist Related Help Screens, iTunes v1.0, Apple Computer, Inc., Jan. 2001.
Kawamoto et al., "On 1st Birthday, iTunes Unwraps New Features," Apr. 28, 2004, http://news.com.com/On+1st+birthday,+iTunes+unwraps+new+features/2100-1027_3-5201598.html.
Lowery, Daryl, "Random-Access Digital Audio-Recording Systems," pp. 68-71, Jun. 1992.
Lyra, Personal Digital Player, RCA, Product Box (2003).
Mabini, MemMaid Review, Pocket PC Dubai, Jul. 23, 2004 [online], [retrieved on Mar. 26, 2008], Retrieved from the Internet: URL: http://www.pocketpcdubai.com/DinarSoft/memmaid_review.html.
MG-25, Portable MPEG4 Player (MG-25), Jul. 29, 2004, 1-3 pgs.
Miniman, "Applian Software's Replay Radio and Player v1.02," Product review, pocketnow.com, http://www.pocketnow.com/reviews/replay/replay.htm, Jul. 31, 2001.
Miser et al., "iPod + iTunes Starter Kit," Publisher: Que, Pub Date: Dec. 1, 2004, pp. 1-12.
Musicmatch, "Musicmatch and Xing Technology Introduce Musicmatch Jukebox," May 18, 1998, http://www.musicmatch.com/info/company/press/releases/?year=1998&release=-2.
Nielsen et al., "Comparative Design Review: An Exercise in Parallel Design," Interchi '93, pp. 414-417, Apr. 24-29, 1993.
Notification of Reason for Refusal for Japanese Patent Application No. 2007-510885 dated Aug. 17, 2010.
Obrador, Pere, "Automatic Color Scheme Picker for Document Templates based on Image Analysis and Dual Problem," Jan. 19, 2006, Hewlett-Packard Laboratories, pp. 1-10.
Office Action for Canadian Patent Application No. 2,564,735, dated Jan. 16, 2013.
Office Action for Canadian Patent Application No. 2,564,735, dated Oct. 21, 2014.
Office Action for Chinese Patent Application No. 200580018105.9 dated Aug. 29, 2016.
Office Action for Chinese Patent Application No. 200580018105.9 dated Dec. 16, 2011.
Office Action for Chinese Patent Application No. 200580018105.9 dated Jan. 29, 2010.
Office Action for Chinese Patent Application No. 200580018105.9 dated Mar. 26, 2015.
Office Action for Chinese Patent Application No. 200580018105.9 dated Mar. 3, 2016.
Office Action for Chinese Patent Application No. 200580018105.9 dated Oct. 13, 2015.
PBS Local Insertion Server Instruction Manual, Microvision, Inc., pp. 1-71, Jun. 19, 1996.
PCT Application No. PCT/US05/14262, International Search Report dated Feb. 2, 2006.
PCT Application No. PCT/US05/14262, Written Opinion dated Feb. 2, 2006.
Personal Jukebox (PJB), "Systems Research Center and PAAD," Compaq Computer Corp., Oct. 13, 2000, http://research.compaq.com/SRC/pjb/.
RCA Lyra User's Guide, RD2201/2202/2204, www.lyrazone.com, pp. 1-37 (1999).
RCS Works—Cart Wall User's Guide and Reference Manual, pp. 1-83, Feb. 7, 1993.

(56) References Cited

OTHER PUBLICATIONS

RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#.

Rejection Decision for Chinese Patent Application No. 200580018105.9, dated Jun. 5, 2012.

Rejection Decision for Chinese Patent Application No. 200580018105.9, dated May 17, 2017.

Replay Gain, "Replay Gain—A proposed Standard," Oct. 7, 2001, available from http://replaygain.hydrogenaudio.org/index.html and http://replaygain.hydrogenaudio.org/outline.html.

Sadie Master System, Product Brochure, Studio audio Digital Equipment Inc., 2 pgs. Jan. 1995.

Sinitsyn, Alexander. "A Synchronization Framework for Personal Mobile Servers," Pervasive Computing and Communications Workshops, 2004. Proceedings of the Second IEEE Annual Conference on, Piscataway, NJ, USA, IEEE, Mar. 14, 2004, pp. 208-212.

Specification Sheet, iTunes 2, Apple Computer, Inc., Oct. 31, 2001.

Steinberg, 'Sonicblue Rio Car,' Product Review, Dec. 12, 2000, http://electronics.cnet.com/electronics/0-6342420-1304-4098389.html.

Torrone, Phillip, "HOW-TO: Getting Podcasts on a Portable Media Center (and other Windows Media Devices)," Oct. 12, 2004 [online], [retrieved on Jun. 5, 2009], Retrieved from Engadget <URL: http://www.engadget.com/2004/10/12/hot-to-getting-podcasts-on-a-portable-media-center-and-other/>.

Travis Butler, "Archos Jukebox 6000 Challenges Nomad Jukebox," Aug. 13, 2001, http://db.tidbits.com/getbits.acgi?tbart-06521.

Travis Butler, "Portable MP3: The Nomad Jukebox," Jan. 8, 2001, http://db.tidbits.com/getbits.acgi?tbart=06261.

TuneBase 100 User Guide, A CD Library Management System, Escient, Inc., copyright 1999.

TuneBase Pro Mk-II User's Guide, Escient, Inc., 1999.

Vetro et al., "Media Conversions to Support Mobile Users," IEEE Canadian Conference on Electrical and Computer Engineering, Piscataway, NJ, May 13, 2001, pp. 607-612.

Wave Station Digital Audio Automation System, Instruction & Operations Manual Broadcast Software International, pp. 1-113, Feb. 4, 1997.

Windows Media Player 6.4, Microsoft Corp., copyright 1999, software available at http://www.oldversion.com/program.php?n=wmp See also Windows Media Player 6.4 Software Official Website at http://www.microsoft.com/windows/windowsmedia/player/version64/default.aspx.

Windows XP Service Pack 2, Figures 1-2 and "How to obtain the latest Windows XP service pack," Aug. 25, 2004.

Zheng et al., "MobiGATE: a mobile gateway proxy for the active deployment of transport entities," Proceedings of the 2004 International Conference on Parallel Processing, Piscataway, NJ, Aug. 15, 2004.

\* cited by examiner

*FIG. 2*

METHOD AND SYSTEM FOR SHARING PLAYLISTS

RELATED APPLICATIONS

This application is a continuation of, and claims priority to, U.S. application Ser. No. 10/833,879, filed on Apr. 27, 2004, which is incorporated herein by reference in its entirety.

BACKGROUND OF THE INVENTION

Field of the Invention

The present invention relates to playlists and, more particularly, to sharing playlists via a central server.

Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

One popular approach to music distribution is mp3.com which uses a centralized server for storage of the numerous songs that are available for download. Another popular approach to music distribution was Napster in which peer-to-peer sharing was utilized. With peer-to-peer sharing, the numerous songs reside on the user machines of the many users, not on a centralized server.

Various Internet web sites have made it possible to purchase music. In order to purchase goods, the purchaser must typically enter his or her credit card information for each purchase. Some web sites have made it possible for repeat customers to simplify this process by storing the user's credit card information so that this information need not be re-entered for each purchase. This is generally accomplished through a user account.

Unfortunately, it is often difficult for users to identify which songs or albums they have already purchased. In addition, the availability of peer-to-peer sharing has been to a large part eliminated in response to allegations of copyright infringement. As a result, users can no longer share songs or albums among one another.

In view of the above, it would be desirable if users could share music without the risk of copyright infringement.

SUMMARY OF THE INVENTION

The present invention pertains to methods and apparatus for sharing a playlist. Specifically, a user may publish a playlist over a network (e.g., Internet). The disclosed embodiments may be implemented in association with a web site, thereby enabling a user to purchase items in the published playlist (or listen to samples of the items) via the web site.

In the following description, a list that lists one or more tracks (e.g., songs) and/or one or more albums (i.e., a purchasable unit such as a tape or CD) will be referred to as a "playlist." The playlist may be manually or automatically generated. It is important to note that the playlist is a list of attributes of each item (e.g., song) sufficient to identify the item (e.g., on the web site or server), and does not provide unlimited access to the actual content of tracks or albums referenced in the playlist.

In accordance with one aspect of the invention, methods and apparatus for sharing a playlist are disclosed. When a playlist identifiying at least one of one or more tracks and one or more albums is received, the playlist may then be published by submitting a request to publish the playlist. The playlist is then published such that it is viewable by one or more individuals.

In accordance with another aspect of the invention, methods and apparatus for sharing a playlist enable the playlist to be made accessible via an online store from which contents of the playlist can be purchased. When the playlist is received, the contents of the playlist are matched against contents of an online store via which tracks and albums can be purchased. Tracks and albums that cannot be purchased from the online store may then be then filtered (i.e., removed) from the playlist. The filtered playlist may then be published, enabling users to purchase tracks and albums identified in the playlist.

In accordance with yet another aspect of the invention, methods and apparatus for sharing a playlist include obtaining a playlist identifying at least one of one or more tracks and one or more albums. The playlist is then published such that the playlist is viewable by one or more individuals. A request with respect to at least one of the one or more tracks and one or more albums is then received. The request may be, for example, a purchase request or search request. For instance, a search may be performed to ascertain those playlists that include a particular track (e.g., song) and/or album.

In accordance with yet another aspect of the invention, methods and apparatus for sharing a playlist include maintaining one or more playlists, each of the playlists identifying at least one of one or more tracks and one or more albums. One or more of the playlists are published such that the published playlists are viewable by one or more individuals. A request with respect to at least one of the tracks/albums associated with one of the playlists may then be received and processed. For instance, the request may be a purchase request or a search request.

The invention also relates to graphical user interfaces that assist users in sharing a playlist, viewing a playlist, performing various searches, and sampling, listening to, or purchasing items listed in a playlist, as well as those that are used to notify a user that the playlist has been published. For instance, a graphical user interface for use in facilitating the publication of a playlist is disclosed. In addition, a graphical user interface for use in purchasing items listed in a playlist is disclosed.

The invention can be implemented in numerous ways, including as a method, system, device, apparatus, graphical user interface, or computer readable medium. Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 2 is an exemplary graphical user interface for publishing a playlist and viewing a published playlist in accordance with one embodiment of the invention.

DETAILED DESCRIPTION OF THE INVENTION

Embodiments of various aspects of the invention are discussed below with reference to FIGS. 1-7. However, those skilled in the art will readily appreciate that the detailed description given herein with respect to these figures is for explanatory purposes as the invention extends beyond these limited embodiments.

One aspect of the invention pertains to a system and method for sharing a playlist. In the following description, a list that lists one or more tracks (e.g., songs) and/or one or more albums (i.e., a purchasable unit such as a tape or CD) will be referred to as a "playlist." By publishing a playlist, the playlist may be accessible by one or more individuals. For instance, a hypertext link including a Uniform Resource Locator (URL) to the playlist may be transmitted to one or more individuals. The individuals may then access the playlist by clicking on the link provided in the email. As another example, the playlist may simply be accessible via a web site (e.g., central server). The playlist may be accessible by the public, or merely those who have a particular password or email address.

Another aspect of the invention pertains to a system and method for purchasing items such as tracks or albums that are listed in a playlist (e.g., published playlist) over a network. Specifically, the disclosed embodiments may be implemented in association with a web site supporting a user account such as a publisher or purchaser account, thereby enabling the purchaser to purchase track(s) and/or album(s) via the web site that are listed in the publisher's (or purchaser's) playlist.

Another aspect of the invention enables a potential purchaser to sample and purchase items in a playlist (e.g., if it has been uploaded by the purchaser) or a published playlist. Specifically, the potential purchaser can browse through published playlists identifying media items that are available for purchase. The potential purchaser can thereafter purchase one or more media items on-line with great ease. Upon purchasing a media item, the content for the media item can be downloaded over the network to the purchaser. The content for the media item is then encrypted for the purchaser's use and stored on the purchaser's machine. Thereafter, the purchaser can make use of the media item (e.g., play the media item).

Still another aspect of the invention pertains to a graphical user interface suitable for assisting users in uploading a playlist, publishing a playlist, and purchasing items from a playlist, as well as those that notify a recipient that a playlist has been published.

Figure 1:
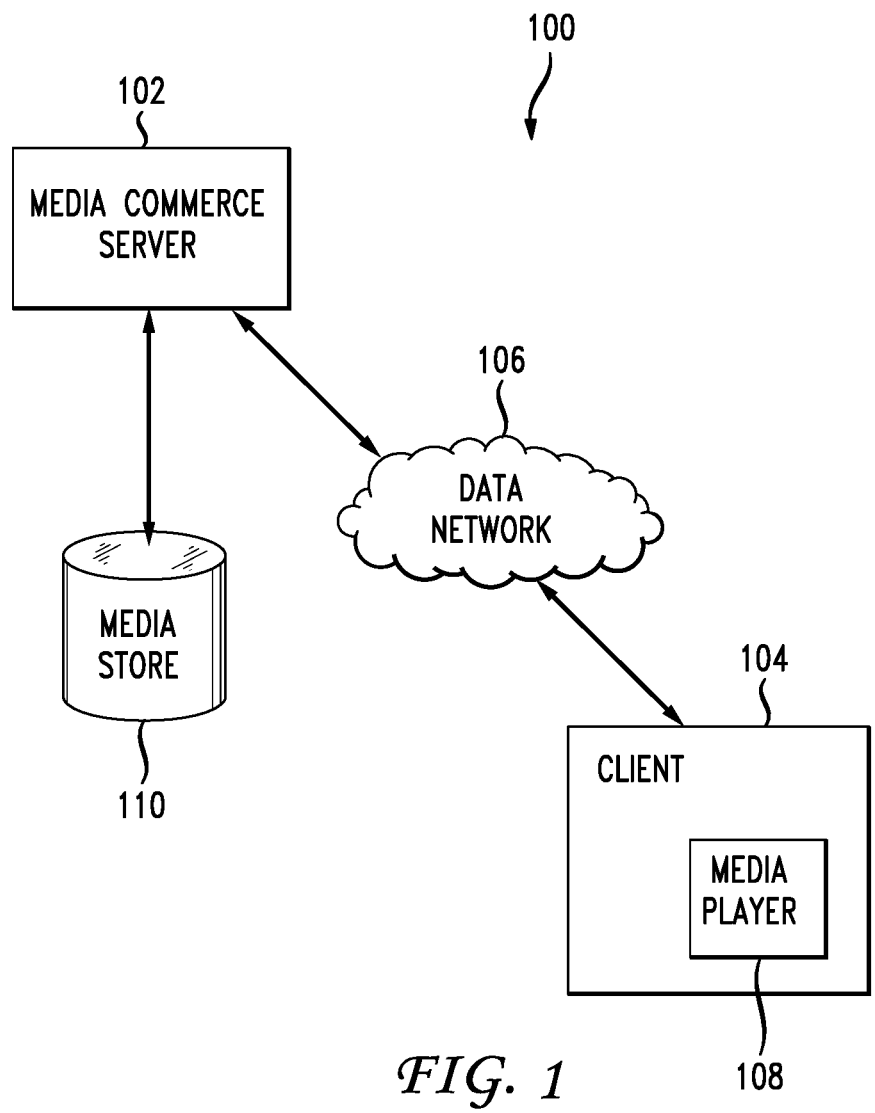
FIG. 1 is a block diagram of a media purchase system according to one embodiment of the invention.

FIG. 1 is a block diagram of a media purchase system 100 according to one embodiment of the invention. The media purchase system 100 includes a media commerce server 102. The media commerce server 102 coordinates review and/or purchase of media items through on-line transactions. On-line transactions to purchase media items is also referred to as electronic commerce (e-commerce). The media purchase system 100 also includes a client 104. Typically, the media purchase system 100 would include a plurality of different clients 104. Each client 104 includes a media player 108. The media player 108 is an application program (e.g., software application) that operates on the client 104, which is a computing device. The client 104 is coupled to the media commerce server 102 through a data network 106. Hence, any of the clients 104 can interact with the media commerce server 102 to review and/or purchase media items. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media store 112. The media store 112 provides mass storage of the numerous media items that are available for purchase via the media purchase system 100. In addition, the media store 112 may provide storage for one or more playlists that have been uploaded and/or published. Once purchased (e.g., via selection from a playlist), the media items can be accessed from the media store 112 over the data network 106 by way of the media commerce server 110.

More particularly, the media purchase system 100 allows a user of the client 104 to utilize the media player 108 to browse, search or sort through a plurality of playlists identifying one or more media items (e.g., tracks/songs or albums) that can be purchased from the media commerce server 102. The media player 108 may also allow the user to preview a media clip (i.e., sample) of the media items (e.g., songs). In the event that the user of the media player 108 desires to purchase a particular media item, the user (via the media player 108) and the media commerce server 102 engage in an on-line commerce transaction in which the user pays for access rights to the particular media item. In one embodiment, a credit card associated with the user is credited for the purchase amount of the particular media item.

In the media purchase system 100, the media items are stored in the media store 112 and retrieved via the media commerce server 102. However, a separate media storage server could additionally be provided and coupled between the data network 106 and the media store 110. The benefit of such a media storage server would be that the media commerce server 102 need not burden its resources to deliver any of the media items that may be purchased to the client 104. Instead, on purchasing a particular media item, the media commerce server 102 sends download information to the media player 108 on the client 104. The download information can then be used by the media player 108 (and the client 104) to retrieve the media content for the particular media item by interacting with the media storage server through the data network 106. In this regard, the media storage server obtains the media content corresponding to the particular media item from the media store 112 and downloads such content through the data network 106 to the client 104. The downloaded media content can then be stored on the client 104. In one embodiment, the downloaded media content is encrypted as received at the client 104 but is decrypted and then re-encrypted before persistent storage on the client 104. Thereafter, the media player 108 can present (e.g., play) the media content at the client 104. In addition, media search processing/browsing may be performed by an application program operating on a client. The application program is, for example, the media player 108 illustrated in FIG. 1.

Here, in one example, the media commerce server 102 illustrated in FIG. 1 can also serve as the media storage server. However, it is important to note that these functions may be implemented in separate servers. The search request may be a request to the remote media server to perform a search in accordance with the search criteria for a particular song or album. For instance, the search may request access to published playlists including a particular song or album. The user may then choose to purchase some or all songs or albums in a particular playlist. Here, the media commerce server 102 includes at least information (e.g., metadata) for a large number of media items that are available to be purchased from the media commerce server 102, though the content of the media items that are purchased may be acquired at the client via download with respect to another remote server, such as the media storage server.

The connections through the data network 106 between the media commerce server 102, the client 104 and the media storage server can be through secure connections, such as Secure Sockets Layer (SSL). Further, the media content may be re-encrypted prior to storage at the client 104 such that downloaded media content is not stored in the clear, but is instead stored in an encrypted manner.

Figure 2:
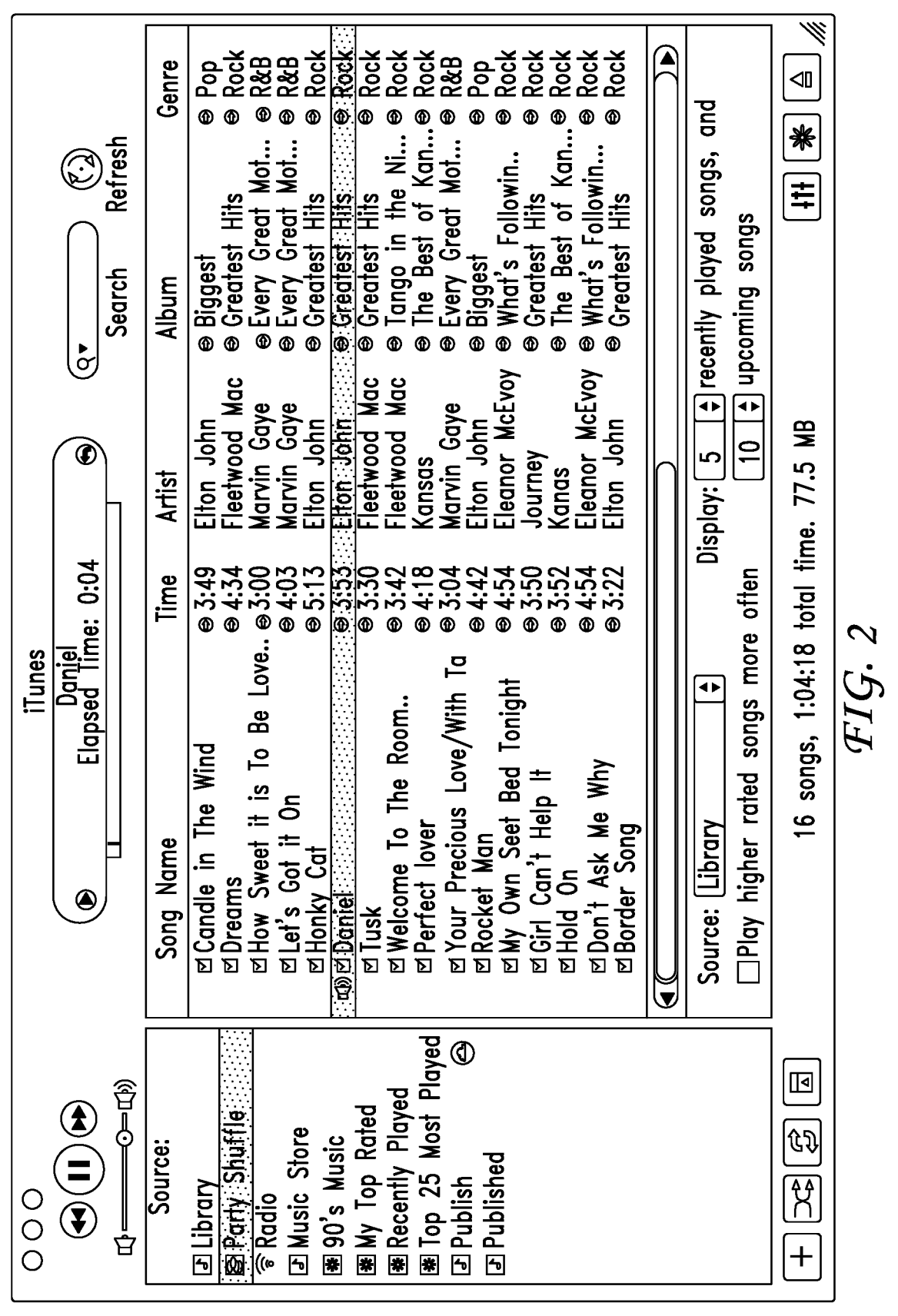

FIG. 2 is an exemplary graphical user interface for publishing a playlist and viewing a published playlist in accordance with one embodiment of the invention. As shown in FIG. 2, various playlists may be generated. As shown, the "Source" may be a playlist that has been placed in the user's "Library," such as the "Party Shuffle" playlist. Other playlists may also be generated, such as the "90's Music" and "My Top Rated" playlists. Thus, a user may select a preexisting playlist. A playlist may be manually or automatically generated. Automatic generation may include generation based upon one or more criteria (e.g., genre, artist).

In order to publish a playlist identifying one or more tracks and/or albums, the playlist is first obtained. Specifically, the playlist is uploaded for publishing. In this example, the playlist "Party Shuffle" has been uploaded for publishing. As can be seen from this example, a playlist includes one or more tracks (e.g., songs) and/or albums. For each entry in the playlist (e.g., song), the name is identified. For each song, the artist is also identified. In addition, an album name, genre, play time and personal rating (not shown) may also be identified in a playlist entry for a track such as a song. For instance, the genre may be pop, rock, or R&B. Although songs are identified in the exemplary playlist, other entries may also be identified. For instance, an entry may merely identify a track or, alternatively, an album.

When the playlist is received, the playlist may then be published for access by one or more additional users. The contents of the playlist may be published in the order in which the contents are listed in the uploaded playlist. Publishing may merely involve publishing all text contents of a playlist, such as those set forth above. However, the playlist may also be filtered prior to publishing, as will be described in further detail below with reference to FIG. 3.

Figure 3:
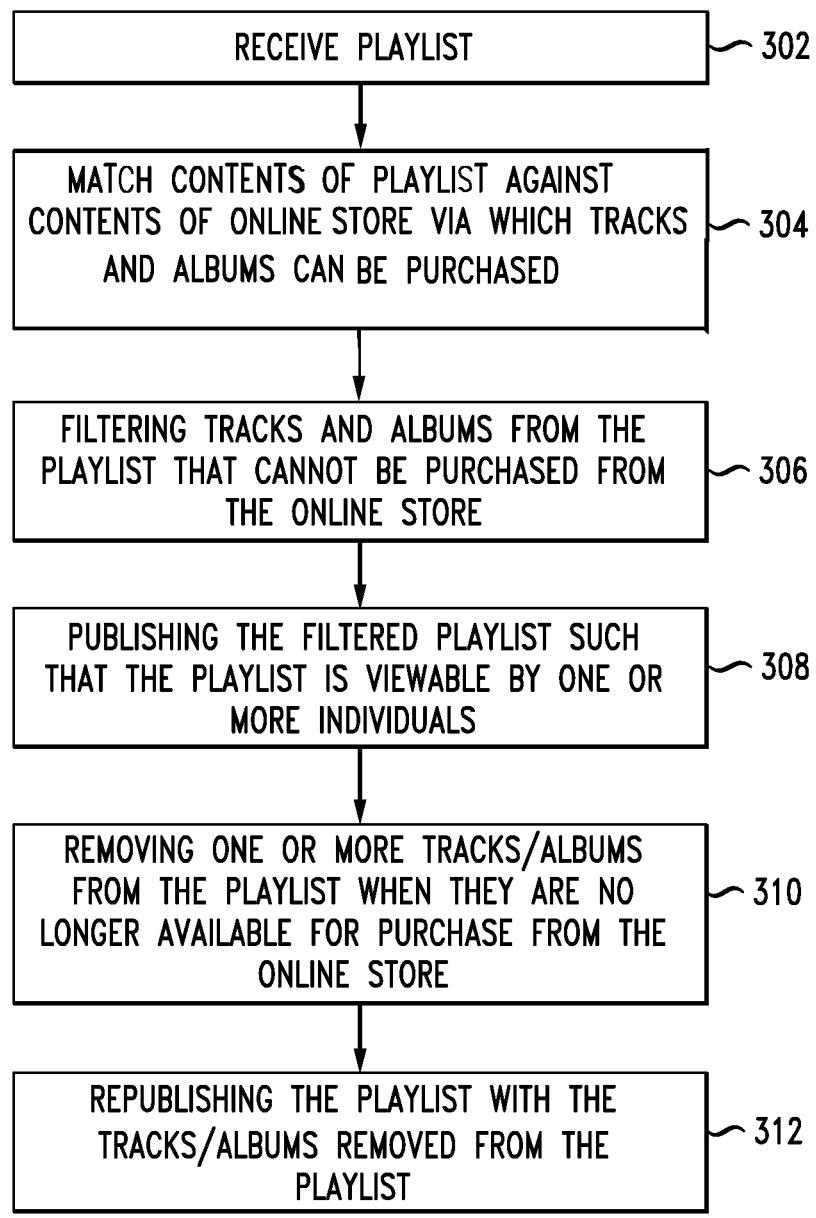
FIG. 3 is a process flow diagram illustrating a method of publishing a playlist in accordance with one embodiment of the invention.

FIG. 3 is a process flow diagram illustrating a method of publishing a playlist in accordance with one embodiment of the invention. As shown at block 302, a playlist is received. For instance, the playlist may be uploaded by a user intending to publish the playlist. In this manner, the playlist may be sent to an online store. As described above, the playlist identifies at least one of one or more tracks (e.g., songs) and one or more albums. The contents of the playlist (e.g., textual contents) are then matched against the contents of an online store via which the tracks and/or albums can be purchased at block 304. The matching may be performed in the order in which the contents are listed in the playlist. Tracks and albums that cannot be purchased from the online store are then filtered from the playlist at block 306. The filtered playlist may then be published at block 308 such that the playlist is viewable by one or more individuals. As set forth above, the contents of the playlist may be published in the order in which the contents are listed in the uploaded playlist. Similarly, when songs or albums are no longer stocked by the store, these songs and albums can be removed from the published playlist. Thus, at block 310, the tracks/albums that are no longer available for purchase from the online store may be removed from the playlist. The playlist may then be republished at block 320.

By filtering albums or songs from published playlists that cannot be purchased from the online store, only those items that can be purchased from the online store are present in the published playlists. A user may then click on any album or song playlist entry to purchase that album or song from the online store.

Other types of tracks and albums may also be filtered from a playlist prior to publishing the playlist. For instance, pornographic or obscene names associated with tracks or albums may be filtered from the playlist. In addition, the number of items in a playlist that is published may be limited and therefore the playlist may be filtered accordingly, such as through removal of the last entries in the playlist.

Figure 4:
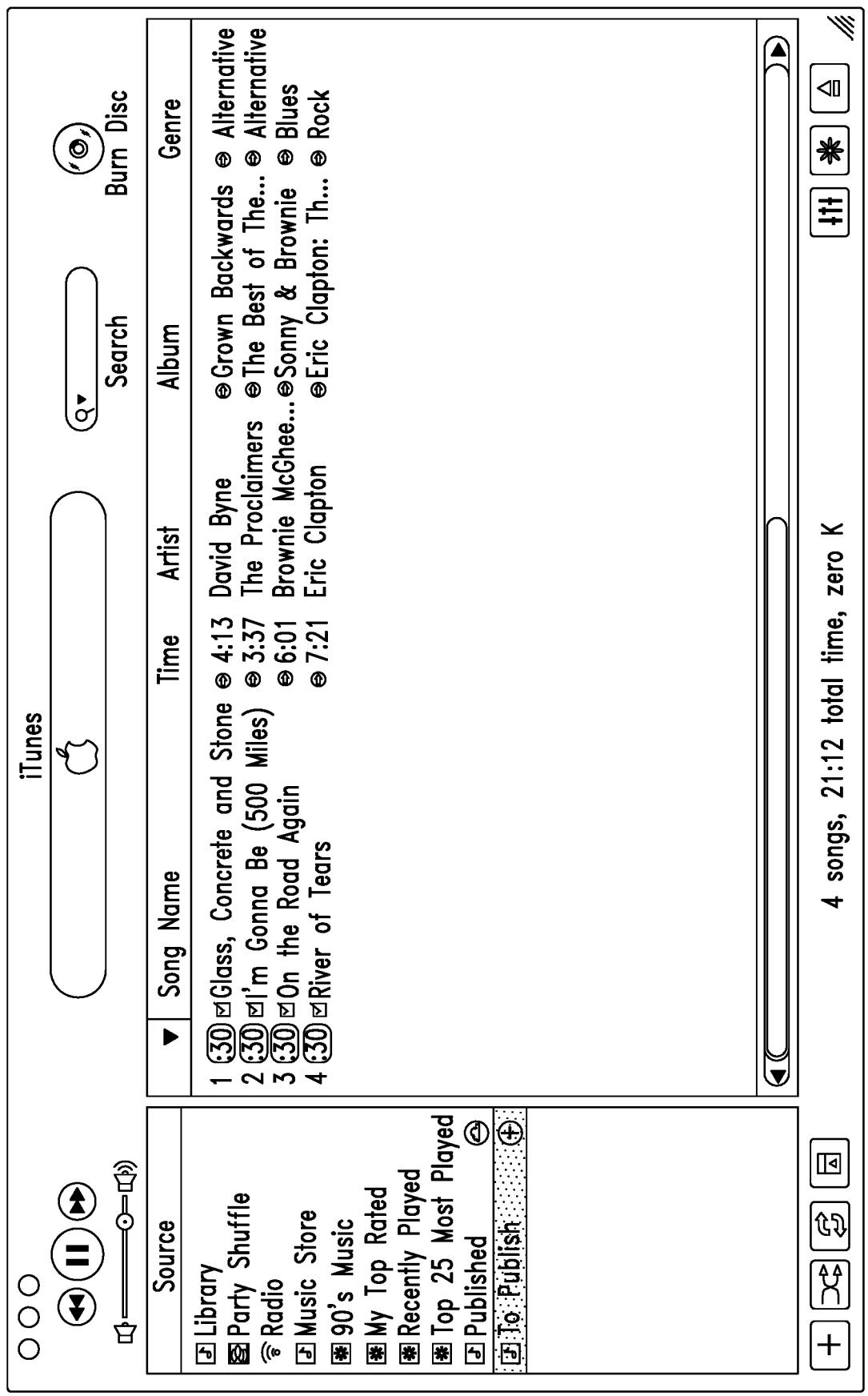
FIG. 4 is an exemplary graphical user interface that may be used to publish a playlist in accordance with one embodiment of the invention.

A user may submit a request to publish any playlist such that the playlist is viewable by one or more individuals. FIG. 4 is an exemplary graphical user interface that may be used to publish a playlist in accordance with one embodiment of the invention. As shown in FIG. 4, the user may select a publish playlist option by clicking on the "To Publish" link to submit a request to publish a particular playlist. In accordance with one embodiment, publication of playlists is account-based. Thus, the publish playlist option may be available for selection from an account page for an individual selecting the publish playlist option. Once a playlist is published, an indicator may be used to indicate that the playlist has been published. In this manner, a user may ascertain whether he or she has published a particular playlist. In addition, the published playlist may be relocated to a group of published playlists such as a group of published playlists that have been published by that user. Publication of a playlist may also be indicated by a status associated with the playlist. Specifically, the status may indicate whether the playlist is public or private. A public status may indicate that the playlist is accessible by a plurality of individuals (e.g., one or more specified individuals or the public), while a private status may indicate that the playlist is accessible only by the individual responsible for uploading the playlist. Thus, a playlist would have a status of private prior to publishing the playlist and a status of public after publishing the playlist.

Publication may be achieved in a variety of manners. For instance, publication may result in a playlist that is viewable by the public, or merely one or more individuals specified by the publisher. Thus, the publisher may notify one or more individuals of the publication, which may be achieved via a pop-up window, e-mail or other suitable mechanism. For instance, the publisher may provide a URL, which may be provided to one or more individuals via an email indicating that the playlist can be accessed via the URL. Thus, a published playlist may be accessed via a link to a web site (e.g., iTunes Music Store). In other words, the publishing user may specify the individual(s) by whom the playlist may be viewed after the playlist is published. Of course, it is possible for the user to modify the group of individuals after the playlist has been published (e.g., by adding users to the publication group). This may be accomplished, for example, by entering the email address of the specified users into the system for automatic notification. Alternatively, each individual may be emailed directly to notify the individual of the playlist publication, and to provide the URL to the individual. Each of the specified individuals may thereafter access and view the playlist by clicking on the link provided in the email. Alternatively, a published playlist may be made available via a web site and accessed via a password which may be transmitted or provided to the intended receipients. In this manner, one or more playlists may be provided via a central server.

In addition to accessing a published playlist via a URL, the URL may also provide access to an online store from which contents of the published playlist may be purchased. Various methods of purchasing items listed in a published playlist will be described in further detail below.

Assuming playlists have been published and accessible by the public, a user may submit a search request to search the playlists. As one example, the request may be a request to display one or more playlists including a particular search term, track (e.g., song), or album. The request may be a request to display the most viewed playlists such as those including one or more specified tracks and/or albums. Similarly, the request may be a request to display the most purchased playlists such as those including one or more specified tracks and/or album. The playlists identified in the search results are then provided in response to the request. In some embodiments, permission to view the published playlists may be verified (e.g., via email address or password). As another example, a user may submit a request for those tracks and/or albums purchased by individuals who purchased a particular track or album. Thus, the identification of one or more tracks/albums purchased by the individual publishing a particular playlist may be accessed. In this manner, a user may search for and purchase similar or closely related types of music.

Figure 5:
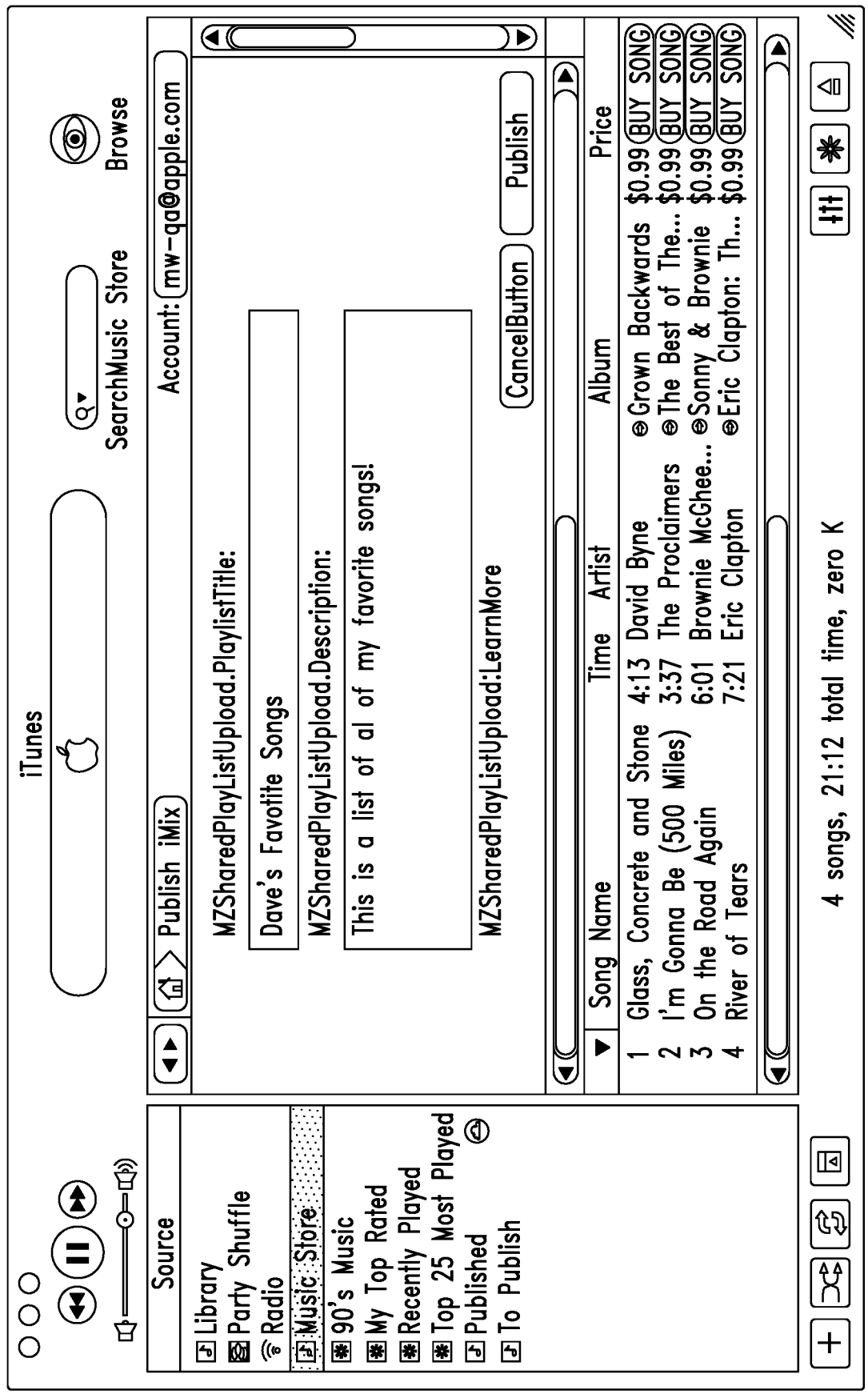
FIG. 5 is an exemplary graphical user interface that may be presented to a user that has requested publication of a playlist in accordance with one embodiment of the invention.

FIG. 5 is an exemplary graphical user interface that may be presented to a user that has requested publication of a playlist in accordance with one embodiment of the invention. Once a user has requested publication of a particular playlist, the user may provide a description and/or title of the playlist. Alternatively, a default description and/or title may be used, such as the previously established description and/or title. In addition, confirmation is obtained prior to uploading or publishing the playlist. In this example, a "Cancel Button" is provided to enable the user to confirm his or her intention to publish the playlist. If the user wishes to cancel the request to publish, the user may click on the "Cancel Button." Alternatively, the user may confirm his or her intention to publish by selecting a publish playlist option from the online store by clicking on the "Publish" button.

Upon publication, a title or description may be filtered to remove any unwanted language. For instance, any offensive or obscene language may be removed. In addition, personal information such as addresses and phone numbers may be removed.

As shown in FIG. 5, a purchase price may be provided in association with each playlist item. Specifically, a purchase price associated with the online store may be retrieved and published with the playlist item. In addition, or alternatively to a per-item purchase price, it is also possible to purchase items as a group. For instance, if it is cheaper to purchase an album including multiple tracks presented in a published playlist than it is to purchase the tracks separately, a purchase price associated with the album may be provided or obtained for the purchase transaction. Thus, the purchase of the album may be offered at the album price rather than the sum of the price of the requested tracks.

Figure 6:
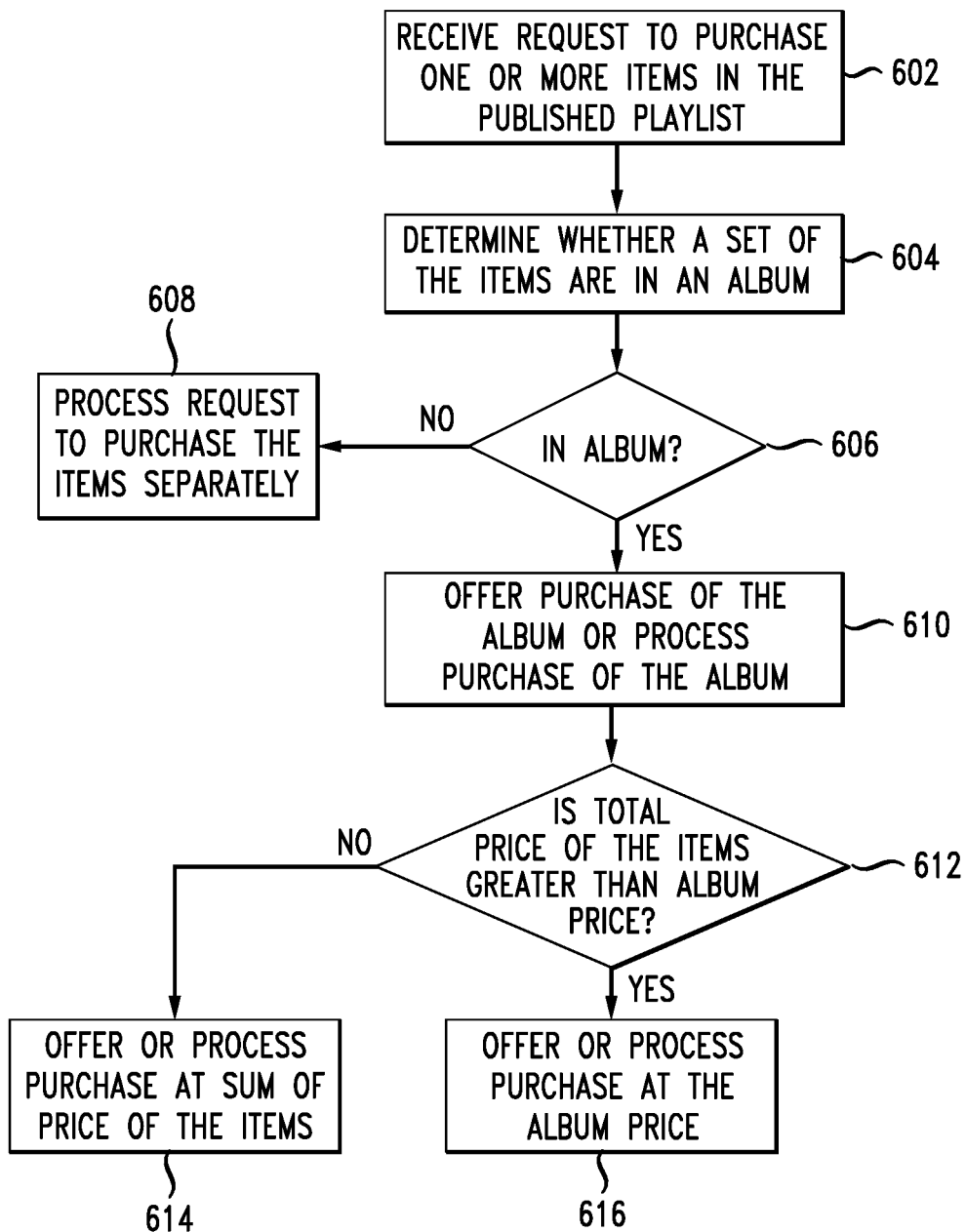
FIG. 6 is a process flow diagram illustrating a method of purchasing tracks or albums presented in a published playlist in accordance with one embodiment of the invention.

An individual accessing a published playlist may purchase one or more tracks or albums identified in the published playlist from the online store. FIG. 6 is a process flow diagram illustrating a method of purchasing tracks or albums presented in a published playlist in accordance with one embodiment of the invention. As shown at block 602, a request to purchase some or all of the tracks/albums identified in the playlist is received. It is then determined whether a set of the items in the playlist are in an album. Specifically, it is determined whether the tracks or a number of tracks (e.g., a majority of the tracks) identified in the playlist are in the same album at block 604. If the tracks or a number of tracks identified in the playlist are not in an album, the request to purchase the items is processed such that each of the items is purchased individually at block 606. Otherwise, an offer to purchase the album is provided at block 610 (or alternatively, the purchase of the album is processed). If the total price of the items (e.g., tracks) is determined not to be greater than the album price at block 612, the request to purchase the items is processed at the sum of the price of the individual items at block 614. However, if the total price of the items is greater than the album price, an offer to purchase the album (or the set of items) is provided at the album price at block 616 (or the purchase request is immediately processed at the album price).

Similarly, if a purchase request indicates a request to purchase all of the tracks/albums identified in a playlist, a discount off of the purchase price may be offered to the purchaser. This discount may be a dollar amount or a percentage amount. This promotional discount may be offered each time a user requests a purchase of an entire playlist, or a percentage (e.g., 90 percent) of a playlist.

Figure 7:
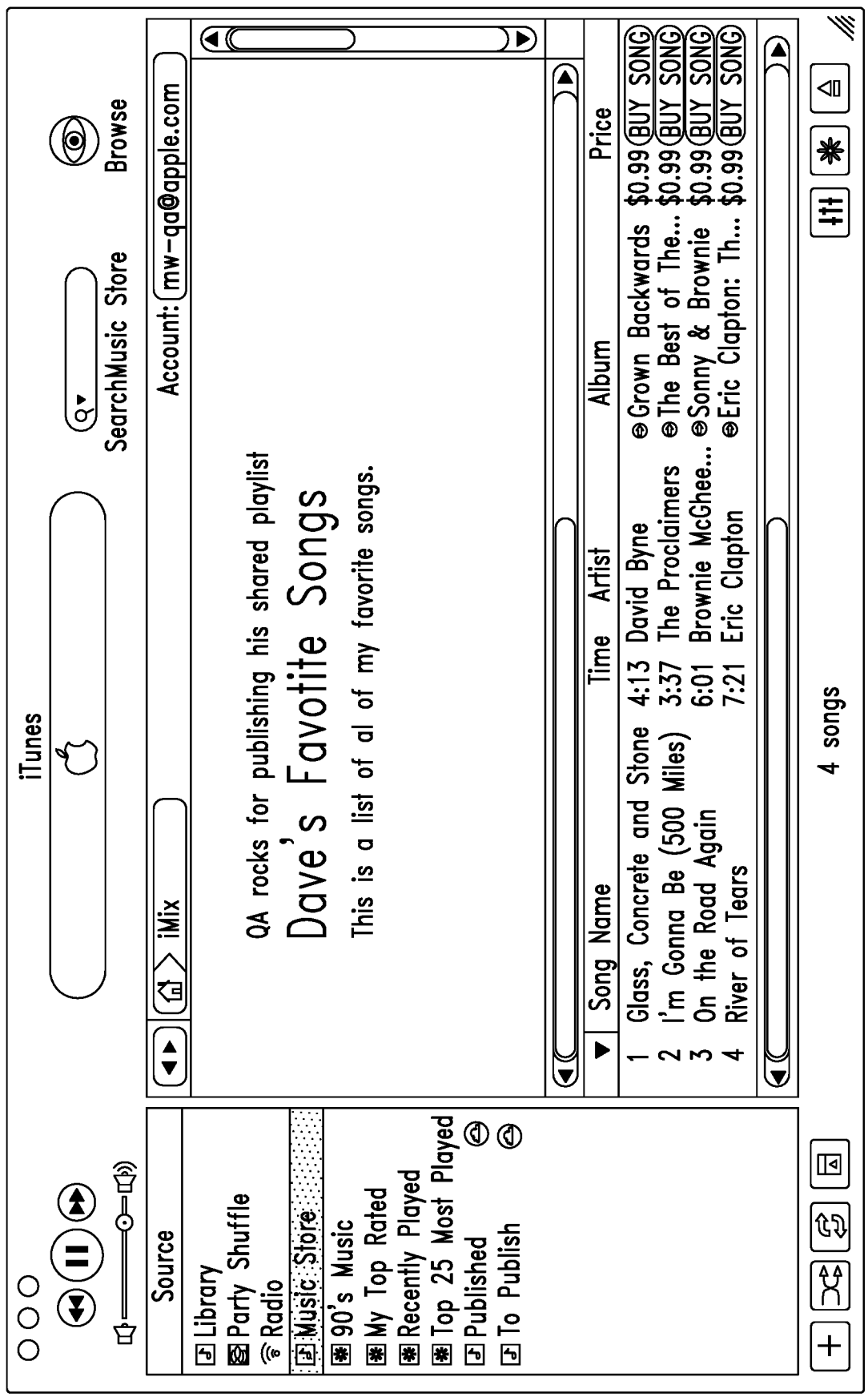
FIG. 7 is an exemplary graphical user interface that may be presented to enable a user to purchase albums or songs that are listed in a published playlist in accordance with one embodiment of the invention.

FIG. 7 is an exemplary graphical user interface that may be presented to enable a user to purchase albums or songs that are listed in a published playlist in accordance with one embodiment of the invention. In this example, a purchase price is listed for each playlist item. The user may click on the "Buy Song" icon to purchase the corresponding song. Similarly, the user may simply choose to listen to a sample for that song (if present). The sample may then be copied to a selected library (e.g., associated with the individual). Alternatively, the user may wish to listen to the user's copy of the song. Thus, a comparison of the text in the playlist entry may be compared to songs stored in the user's library present on the web site or on the user's local memory. Once a match has been found, the user's copy of the song may be played.

In order to keep track of those tracks/albums that have already been purchased, the tracks/albums in the playlist may be flagged to indicate that they have been purchased by the individual viewing the published playlist from the online store. The individual (purchaser) may be the individual who uploaded and published the playlist or, alternatively, the purchaser may be an individual accessing the published playlist (e.g., via the URL). The flagged items may be visible from the user (purchaser) account. Moreover, the tracks/albums that have been purchased may be flagged (e.g., in response to a request for flagging the purchased items). Other information may similarly be displayed for a published playlist, such as the number of people who purchased all items (e.g., albums/tracks) in a particular playlist, or the number of people who accessed a particular playlist.

Once a playlist has been published, a publishing user may wish to unpublish the published playlist. This may be accomplished, for example, by selecting an unpublish playlist option from the online store. The playlist may then be deleted from the online store, or unpublished in a similar manner via an indicator or other suitable mechanism. For instance, publishing may be performed in accordance with a publication status associated with each of the playlists, where the publication status when in a first state indicates that the corresponding playlist is to be published and when in a second state indicates that the corresponding playlist is not to be published.

An individual who has uploaded and published a particular playlist may wish to modify the published playlist. For instance, the individual may wish to add and/or remove one or more tracks/albums from the playlist. In these situations, the individual may wish to republish the playlist such that the modified playlist is uploaded and viewable by one or more individuals. Republishing may be initiated via selection of a republish playlist option. The republish playlist option, like the publish playlist option, may be selected from an online store from which contents of the published playlist can be purchased. For instance, the republish (and publish) option may be available for selection from an account page for the individual. Similarly, the republication may be achieved via the same notification mechanisms used to accomplish publication. For instance, the modified playlist may be provided via a URL such as the URL via which the playlist was initially published. Thus, the URL may provide access to an online store from which contents of the published playlist can be purchased. Moreover, an email may be sent to one or more individuals indicating that the playlist has been modified. The email may further identify a URL via which the modified playlist can be accessed. In addition, the email may include a message including additional text provided by an individual publishing the playlist. The email may be sent directly by the publisher, or indirectly by specifying or selecting one or more email addresses associated with the intended recipients of the publication/republication notice.

Publication may be implemented by transmitting an identifier associated with a playlist to the server/online store with the playlist. The identifier may also be transmitted with the playlist upon republication. The identifier may, for example, be an email address or password.

It is also possible to contact the publisher of a playlist by submitting a request to contact the publisher (i.e., individual who uploaded and published the playlist). For instance, an email may be sent to the individual, wherein the identity and email address of the individual are kept confidential. In other words, the email may be a blind email sent via the web site. In addition, emails sent by the individual in response may be received upon stripping any email address or other identifying information from the emails.

The various aspects, features, embodiments or implementations of the invention described above can be used alone or in various combinations. In addition, the media items can pertain to audio items (e.g., audio files or songs, such as for music), video items (e.g., video files or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the disclosed advantages. As set forth above, one advantage of the invention is that a user may publish a playlist. Another advantage of the invention is that items listed in a published playlist may be purchased, as well as used to initiate a further search in other published playlists.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A non-transitory computer-readable storage medium comprising:
    instructions stored thereon which, when executed by one or more processors, cause an online media service to:
        receive, from a first client device associated with a user, a first playlist identifying media items associated with the first playlist;
        receive, from the first client device, a first request to publish the first playlist at the online media service;
        in response to the first request to publish the first playlist, identify one or more respective media items at the online media service that correspond to at least one of the media items associated with the first playlist;
        determine, for at least one media item from the media items, that the respective media item corresponding to the at least one media item is not available at the online media service, and wherein generating the second playlist comprises filtering the at least one media item from the media items to yield a filtered set of media items and excluding the at least one media item from the second playlist;

generate a second playlist based on the one or more respective media items corresponding to the at least one of the media items associated with the first playlist;
publish the second playlist at the online media service for access by one or more second users;
send a notification indicating the publication of the second playlist to at least one of the one or more second users; and
receive, from at least one of the one or more second client devices, a second request to access the second playlist.

2. The non-transitory computer-readable storage medium of claim 1, wherein the media items associated with the first playlist comprise local media items selected for the first playlist from the first client device, and wherein identifying the one or more respective media items that correspond to the at least one of the media items associated with the first playlist comprises:
matching the media items associated with the first playlist against a collection of media items available at the online media service; and
based on the matching, determining, for each media item from the media items associated with the first playlist, whether a respective media item corresponding to the media item is available at the online media service.

3. The non-transitory computer-readable storage medium of claim 1, storing additional instructions which, when executed by the one or more processors, cause the online media service to:
receive a third request to modify the second playlist;
modify the second playlist to yield a third playlist; and
publish the third playlist for access from one or more second client devices.

4. The non-transitory computer-readable storage medium of claim 1, wherein the second playlist identifies a plurality of respective media items at the online media service, the plurality of respective media items corresponding to the media items identified by the first playlist.

5. The non-transitory computer-readable storage medium of claim 1, wherein the one or more second users are in a publication group associated with the first user.

6. A system comprising:
one or more processors; and
one or more computer readable media comprising instructions stored thereon which, when executed by the one or more processors, cause the one or more processors to:
receive, from a first client device associated with a user, a first playlist identifying media items associated with the first playlist;
receive, from the first client device, a first request to publish the first playlist at the online media service;
in response to the first request to publish the first playlist, identify one or more respective media items at the online media service that correspond to at least one of the media items associated with the first playlist;
determine, for at least one media item from the media items, that the respective media item corresponding to the at least one media item is not available at the online media service, and wherein generating the second playlist comprises filtering the at least one media item from the media items to yield a filtered set of media items and excluding the at least one media item from the second playlist;
generate a second playlist based on the one or more respective media items corresponding to the at least one of the media items associated with the first playlist;
publish the second playlist at the online media service for access by one or more second users;
send a notification indicating the publication of the second playlist to at least one of the one or more second users; and
receive, from at least one of the one or more second client devices, a second request to access the second playlist.

7. The system of claim 6, wherein the media items associated with the first playlist comprise local media items selected for the first playlist from the first client device, and wherein identifying the one or more respective media items that correspond to the at least one of the media items associated with the first playlist comprises:
matching the media items associated with the first playlist against a collection of media items available at the online media service; and
based on the matching, determining, for each media item from the media items associated with the first playlist, whether a respective media item corresponding to the media item is available at the online media service.

8. The system of claim 6, further comprising instructions to:
receive a third request to modify the second playlist;
modify the second playlist to yield a third playlist; and
publish the third playlist for access from one or more second client devices.

9. The system of claim 6, wherein the second playlist identifies a plurality of respective media items at the online media service, the plurality of respective media items corresponding to the media items identified by the first playlist.

10. The system of claim 6, wherein the one or more second users are in a publication group associated with the first user.

11. A method comprising:
receiving, from a first client device associated with a user, a first playlist identifying media items associated with the first playlist;
receiving, from the first client device, a first request to publish the first playlist at the online media service;
in response to the first request to publish the first playlist, identifying one or more respective media items at the online media service that correspond to at least one of the media items associated with the first playlist;
determining, for at least one media item from the media items, that the respective media item corresponding to the at least one media item is not available at the online media service, and wherein generating the second playlist comprises filtering the at least one media item from the media items to yield a filtered set of media items and excluding the at least one media item from the second playlist;
generating a second playlist based on the one or more respective media items corresponding to the at least one of the media items associated with the first playlist;
publishing the second playlist at the online media service for access by one or more second users;
sending a notification indicating the publication of the second playlist to at least one of the one or more second users; and
receiving, from at least one of the one or more second client devices, a second request to access the second playlist.

12. The method of claim 11, wherein the media items associated with the first playlist comprise local media items selected for the first playlist from the first client device, and wherein identifying the one or more respective media items that correspond to the at least one of the media items associated with the first playlist comprises:
- matching the media items associated with the first playlist against a collection of media items available at the online media service; and
- based on the matching, determining, for each media item from the media items associated with the first playlist, whether a respective media item corresponding to the media item is available at the online media service.

13. The method of claim 11, further comprising:
- receiving a third request to modify the second playlist;
- modifying the second playlist to yield a third playlist; and
- publishing the third playlist for access from one or more second client devices.

14. The method of claim 11, wherein the second playlist identifies a plurality of respective media items at the online media service, the plurality of respective media items corresponding to the media items identified by the first playlist.

15. The method of claim 11, wherein the one or more second users are in a publication group associated with the first user.

* * * * *